United States Patent [19]

Chang

[11] Patent Number: 4,626,164
[45] Date of Patent: Dec. 2, 1986

[54] ROBOT WITH IMPROVED TRANSMISSION SYSTEM

[75] Inventor: Chin-Der Chang, Taipei, Taiwan

[73] Assignee: Timestrong Enterprise Co., Ltd., Taipei, Taiwan

[21] Appl. No.: 736,946

[22] Filed: May 22, 1985

[51] Int. Cl.$^4$ ............................................. B25J 11/00
[52] U.S. Cl. ...................................... 414/735; 74/352; 74/377; 74/665 H; 414/740; 446/354; 446/390; 446/425; 901/1; 901/21; 901/25; 901/28
[58] Field of Search .................... 901/1, 21, 25, 27–29, 901/39; 414/735, 740, 7; 446/353, 354, 390, 280, 424–428; 74/665 H, 352, 377, 66, 89.2

[56] References Cited

U.S. PATENT DOCUMENTS

| 3,521,498 | 7/1970 | Eriksson | 74/66 |
| 3,581,591 | 6/1971 | Ziegler et al. | 74/377 |
| 4,272,918 | 6/1981 | Inoue | 901/1 X |
| 4,282,677 | 8/1981 | Abe | 901/25 X |
| 4,398,720 | 8/1983 | Jones et al. | 901/21 X |

Primary Examiner—Frank E. Werner
Assistant Examiner—Donald W. Underwood
Attorney, Agent, or Firm—Ladas & Parry

[57] ABSTRACT

A robot toy includes a movable arm which is constituted of alternatingly interconnected three first members and three second members. The first member has a first rotating unit for moving the adjacent second member about its longitudinal axis, and the second member has a second rotating unit for rotating the first member about an axis perpendicular to the longitudinal axis. The transmission system for transmitting the output motion of a motor to the arm includes a plurality of transmission cords which are made of metal wires twisted together for the transmission along long transmission lines.

9 Claims, 12 Drawing Figures

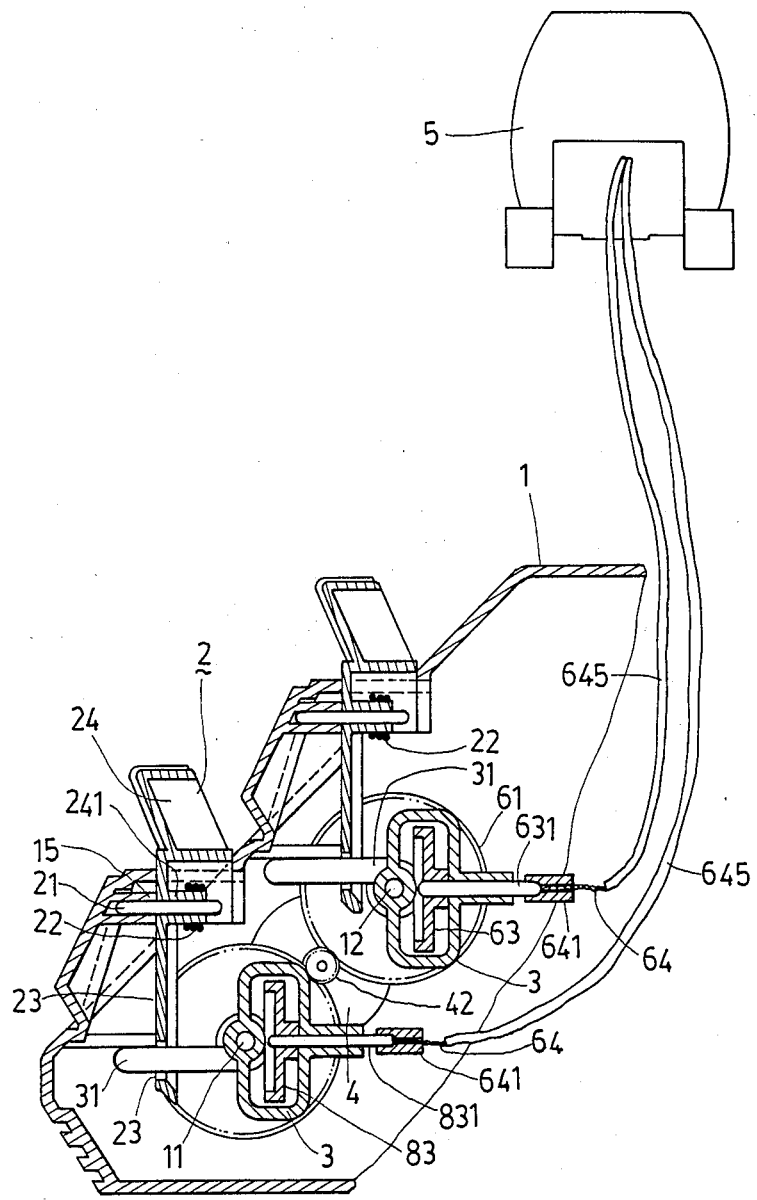
F I G. 11

ROBOT WITH IMPROVED TRANSMISSION SYSTEM

BACKGROUND OF THE INVENTION

This invention relates to a robot toy and particularly to one having sections of arm fitted together and designed to be able to move like a human arm. This is an improvement made on the conventional robot toys which have arms capable of making simple motions.

SUMMARY OF THE INVENTION

An object of the invention is to provide an improved robot toy having an arm that can move like a human arm.

Another object of the invention is to provide an improved robot toy in which the parts employed in the transmission system are designed to be as similar in dimension and form as possible so as to simplify the fabrication of the parts.

Further object of the invention is to provide a robot toy with an improved transmission system which employs a transmission cord for transmitting a motion along a long path so that the amount of elements required to be used for transmitting the motion can be minimized.

These and other objects can be achieved in accordance with the present invention through the provision of a robot including a body which incorporates a movable arm operated by a motor through a transmission system, wherein the movable arm is constituted of alternatingly interconnected first members and second members. The first member has a first end, a second end and a first rotating unit, and the second member has a third end for connection with the first end and the first rotating unit which rotates the second member about the longitudinal axis of the first member, a fourth end for connection with the second end, and a second rotating unit for rotating the first member about an axis perpendicular to the longitudinal axis. The transmission system includes first gear members separately mounted in the robot body and driven by the motor simultaneously, second gear members for meshing with the first gear members respectively, clutch members for engaging and disengaging first and second gear members, and a plurality of transmitting cords which are made of metal wires twisted together and used to interconnect the second gear members and the first and second rotating units for transmitting the movements of the second gear members to the first and second rotating units.

The present exemplary preferred embodiment will be described in detail with reference to the accompanying drawings, in which

BRIEF DESCRIPTION OF THE DRAWINGS

FIG. 11 is a schematic fragmentary view showing how the clutch members are mounted in the robot body;

DETAILED DESCRIPTION OF THE PREFERRED EMBODIMENT

Figure 1:
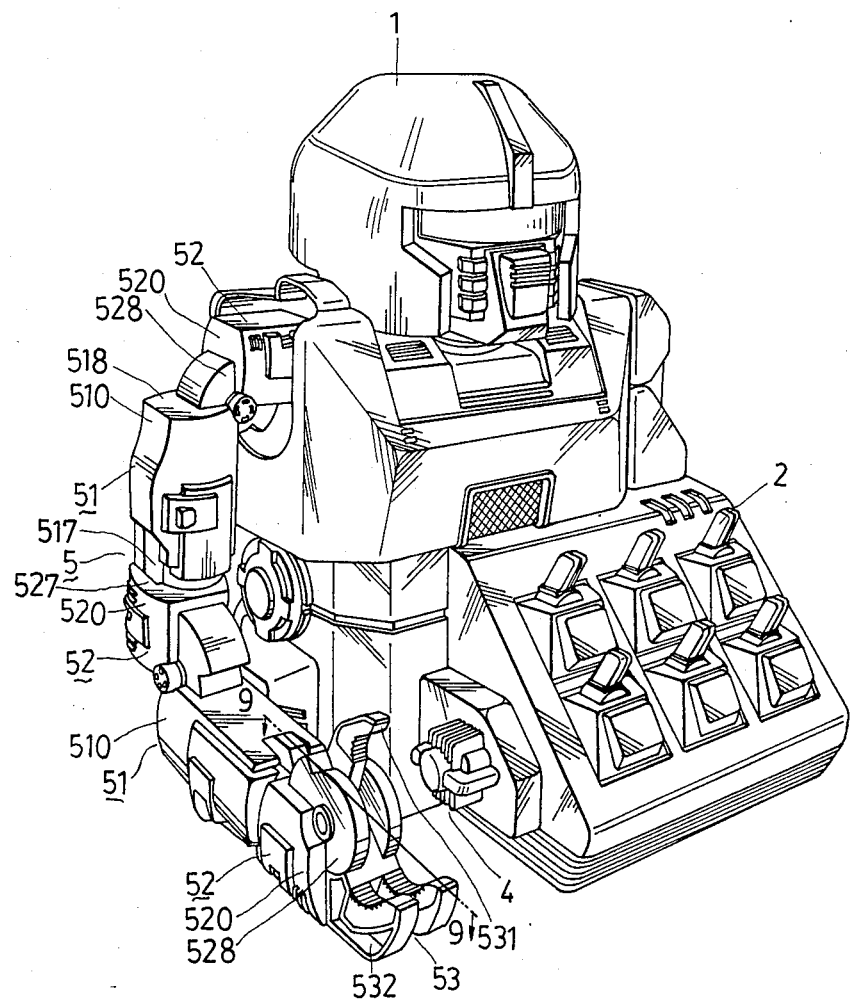
FIG. 1 is a perspective view of a robot incorporating a movable arm and a transmission system embodying the present invention.

Referring to FIG. 1, there is shown a robot which is comprised of a body 1 with a head in which are mounted six clutch members 2 for controlling a gear transmission system which transmits the output motion of a motor 4 to the movable arm 5 of the robot.

The movable arm 5 is constituted of alternatingly interconnected first members 51 and second members 52. The upper arm is constituted of one first member 51 and one second member 52, the forearm is formed of a first member 51, and the hand is formed of a second member 52 and a claw 53. The upper end of the upper arm is connected to a second member 52 which in turn is connected to another first member 51 which is mounted in the body 1 and concealed from view.

Figure 5:
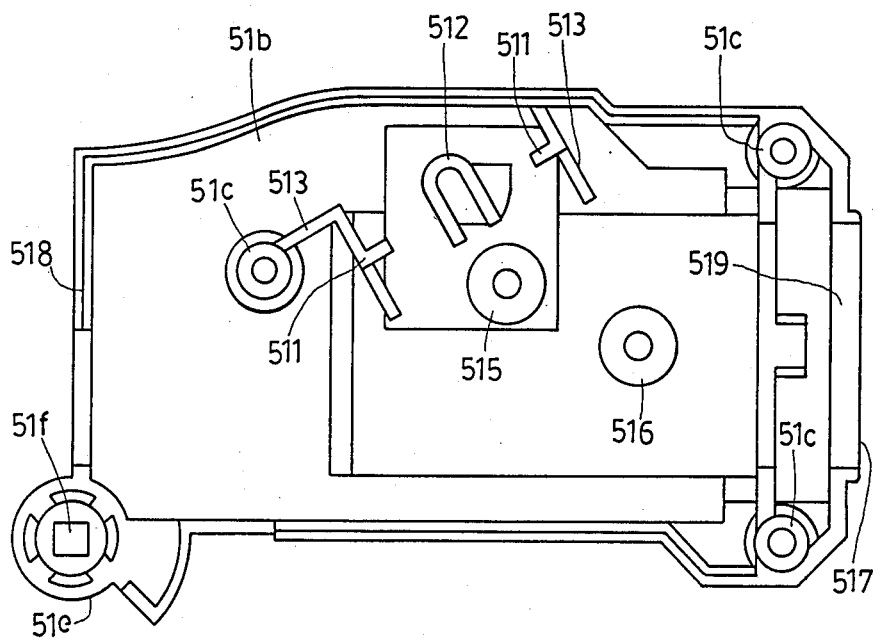
FIG. 5 is is a view of a housing part of the first member.
Figure 6:
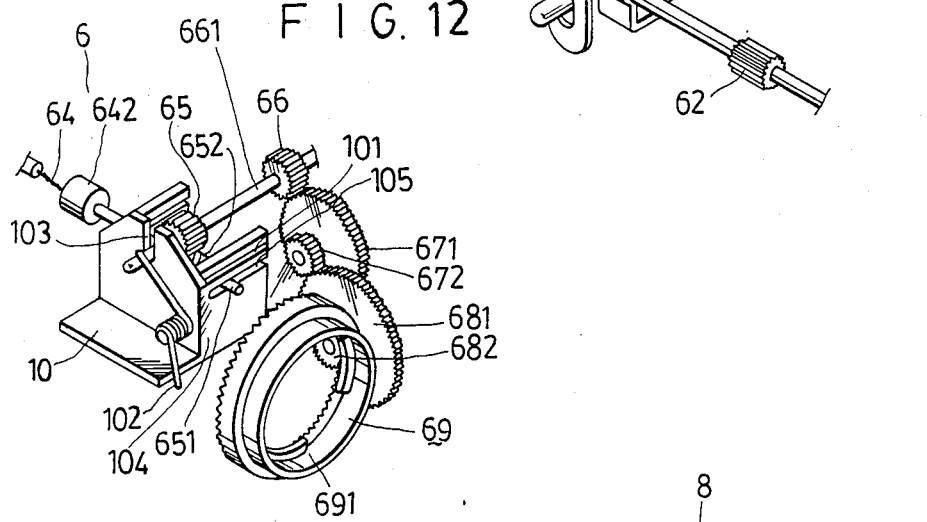
FIG. 6 is a view showing the first rotating unit provided in the first member.

As shown in FIGS. 1, 2, 3 and 4, each first member 51 includes two molded housing parts 51a and 51b constituting an enclosed housing 510. The enclosed housing 510 includes a first connecting end 517 and a second connecting end 518. Inside the enclosed housing 510 is mounted a first rotating unit 6 and a support 10, as shown in FIG. 6. The support 10 includes two spaced apart walls 104 provided with two apertures 101 which are used to be engaged with two projections 511 of brackets 513 (FIGS. 4 and 5) extended from the wall of the housing part 51b for mounting the support 10 on the brackets 513. The rotating mechanism 6 includes a worm 652 having its axis 651 inserted in two opposite apertures 105 of the walls 104. The worm 652 is meshed with a worm gear 65 which is coaxially mounted with a gear 66 on an axis 661 which has its one end fitted in and depressed by a spring 102 against a notch 103 of the support member 10. Another end of the axis 661 is extended into a reversed U-shaped boss 512 of the wall of the housing part 51b (FIG. 5). The gear 66 is then meshed with a gear 671 integrating another gear 672 which in turn is meshed with a gear 681 integrating a gear 682. A crown gear 69 is meshed with the gear 682. The gears 671 and 672 are mounted on an axis (not shown) which is fitted in an annular boss 515 provided on the wall of the housing part 51b. The gears 681 and 682 are mounted on another axis (not shown) which is fitted in an annular boss 516 provided on the wall of the housing 51b. Numeral 51c represents screw holes for attachment of screws (not shown).

Figure 3:
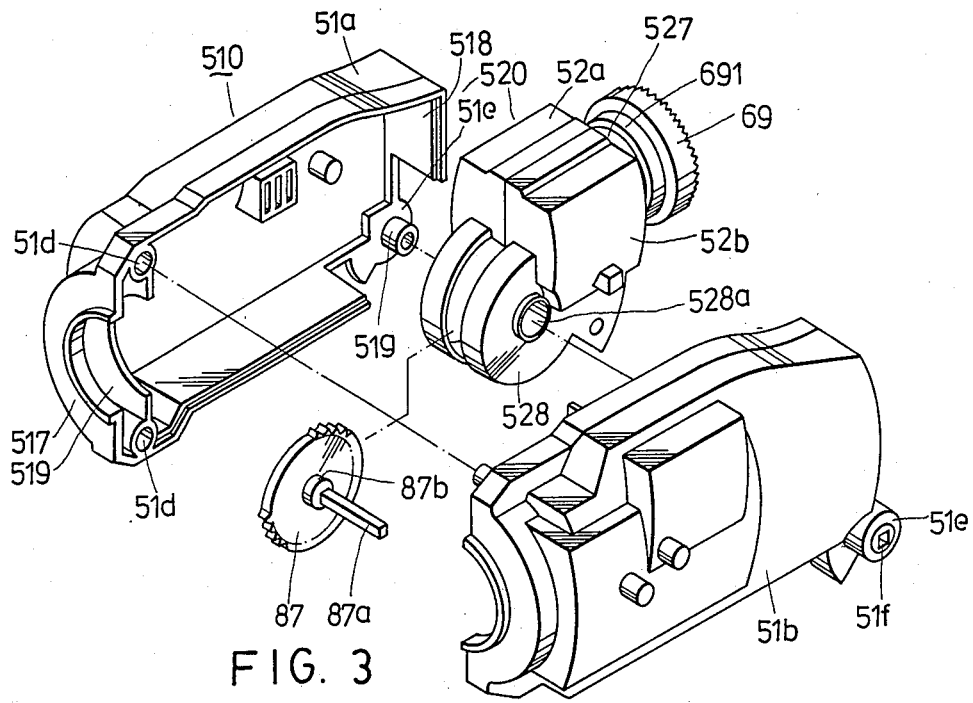
FIG. 3 is an exploded view showing how a first member and a second member are connected.
Figure 4:
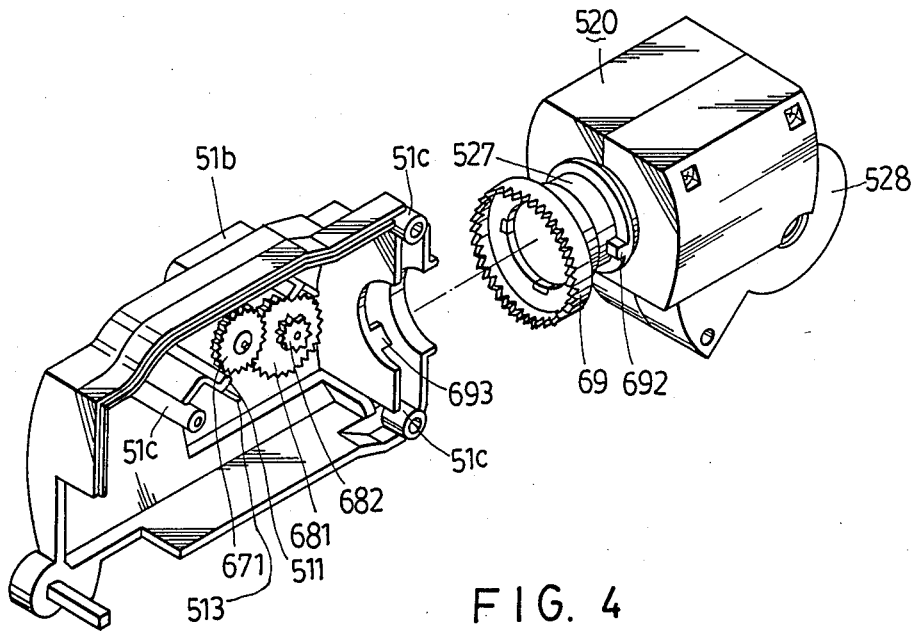
FIG. 4 is another exploded view showing how a first member and a second member are connected.

Referring to FIGS. 1, 3 and 4, each second member 52 includes two molded housing parts 52a and 52b constituting an enclosed housing 520. The housing 520 has two connecting ends 527 and 528. The connecting end 527 can be movably inserted into the housing 510 of the first member 51 through an opening 519 provided in the connecting end 517, and the end 691 of the crown gear 69 is connected to the connecting end 527 by press fitting. Accordingly, the member 52 can be rotated by means of the crown gear 69 relative to the member 51 about the longitudinal axis of the member 51.

Figure 8:
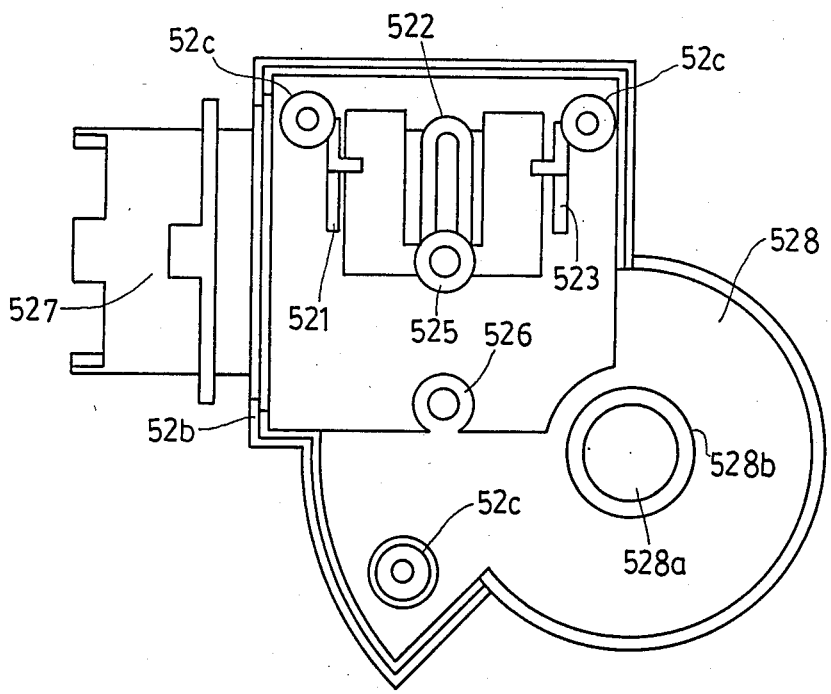
FIG. 8 is a view of a housing part of the second member.
Figure 7:
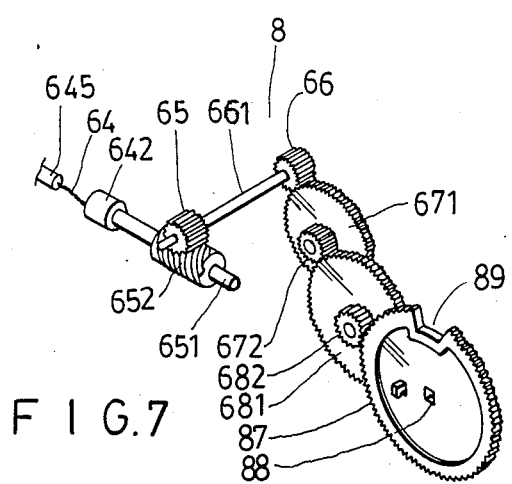
FIG. 7 is a view showing the second rotating unit provided in the second member.

Inside each housing 520 is mounted a second rotating unit 8 which is shown in FIG. 7 in which the elements similar to those element shown in FIG. 6 are represented by the same reference numerals as those elements. The second rotating unit 8 includes a worm 652 mounted in the support 10 (not shown in FIG. 7, but shown in FIG. 6). The worm 652 transmits a movement to a gear 87 through gears 65, 66, 671, 672, 681 and 682. As shown in FIGS. 7 and 8, the worm 652 is mounted on the support 10 which in turn is mounted on brackets 521, 523 of the housing 520. The reversed U-shaped protrusion 522 of the housing 520 holds one end of the shaft 652, annular boss 525 supports the axis of the gears 671 and 672, and annular boss 526 supports the axis of the gears 681 and 682. Numerals 52c represent screw holes for attachment of screws (not shown).

Referring again to FIG. 3, the connecting end 528 of the housing 520 is an extended portion having a smaller cross-section than the other portion. The connecting end 528 can be extended, in part, into the end 518 of the housing 510, with two lobes 51e of the housing 510 being on its two sides. In connecting the end 528 of the second member 52 to the end 518 of the first member 51, a protrusion 51g of the housing part 51a is movably inserted in a circular hole (not shown) of the housing part 52a, a hub 87b of the gear 87 is journalled in the hole 528a of the housing part 52b, and a shaft 87a of rectangular cross-section is fixedly inserted in a hole 51f of the lobe 51e. By means of the gear 87, the first member 51 can be turned relative to the member 52 about an axis which is perpendicular to the longitudinal axis of the member 51.

Figure 9:
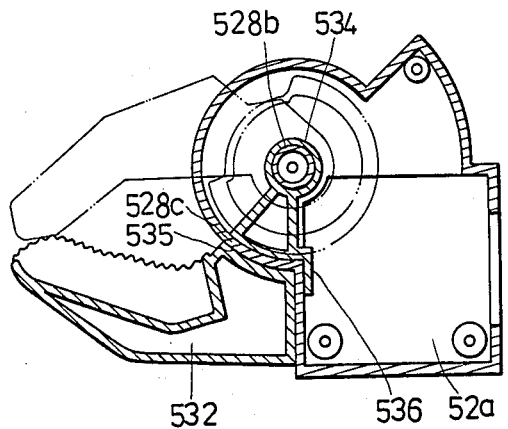
FIG. 9 is a sectional view taken along the line 9—9 of FIG. 1.

Referring again to FIG. 1, the claw member 53 includes an upper claw portion 531 and a lower claw portion 532. As shown in FIG. 9, the lower claw portion 532 is fixedly connected to the housing part 52a by sleeving a tubular attachment portion 534 onto a tubular boss 528b of the housing part 52a and engaging a recess 535 with the curved edge 528c of the housing part 52a. A hook 536 is further provided for engaging with the edge of the housing part 52a.

Figure 10:
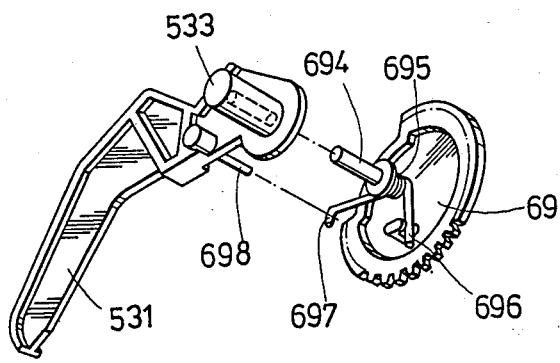
FIG. 10 is a view showing an upper claw portion and a spur gear.

As shown in FIG. 10, the upper claw portion 531 has a socket 533 for receiving a shaft 694 which is fixedly connected to the gear 69. A spring 695 is sleeved onto the shaft 694, with one end thereof being engaged with a stud 696. Another end 697 of the spring 695 is engaged with a pin 698 of the claw portion 531 so as to retain the pin 698 to be engaged with the notched edge of the gear 69, thereby enabling the claw portion 531 to move simultaneously with the gear 69. This upper claw portion 531 is also pivoted to the lower claw portion 532 by inserting the socket 533 into the tubular portion 534 of the lower claw portion 532.

Figure 2:
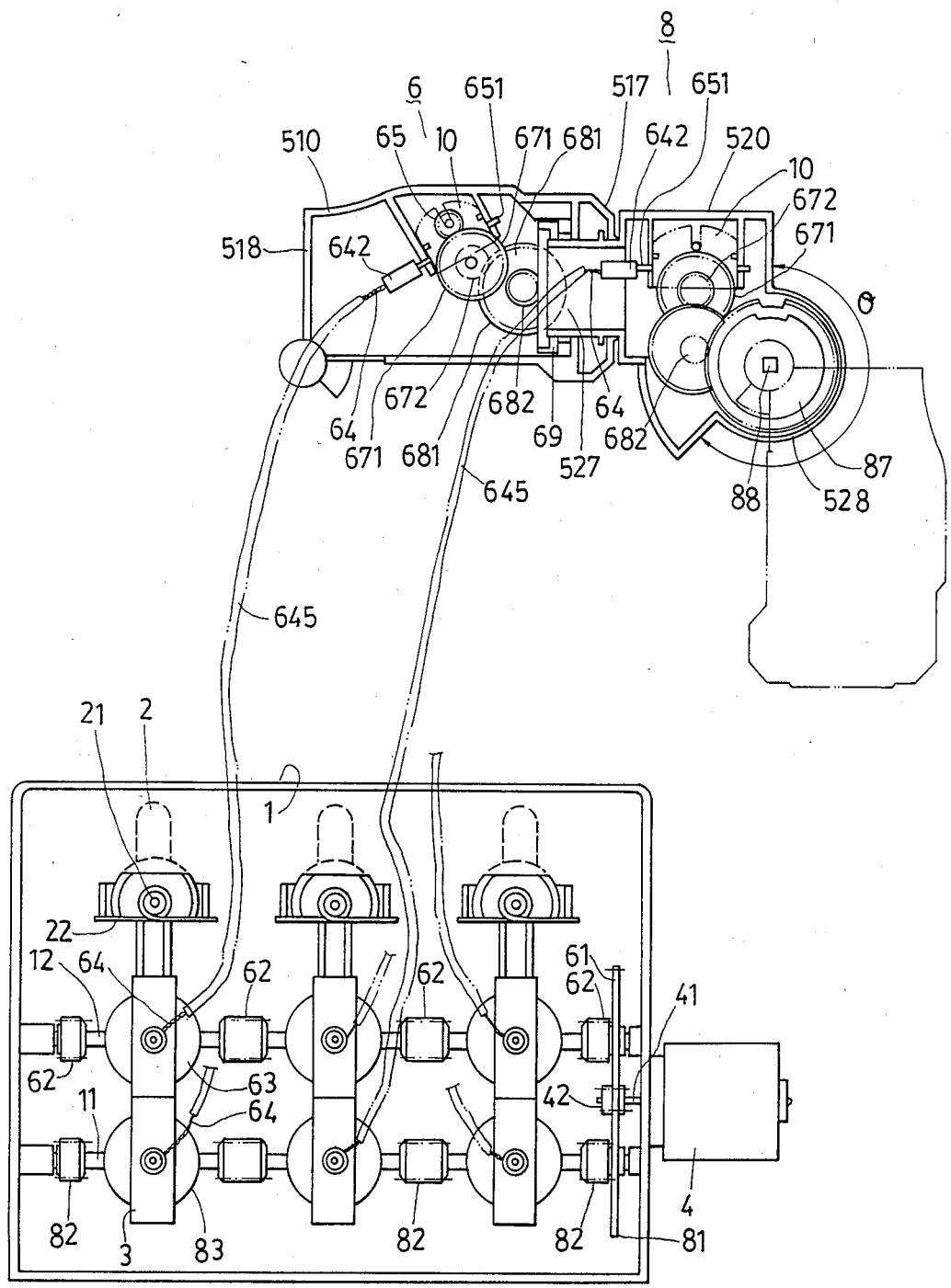
FIG. 2 is a schematic view showing how the output motion of the motor is transmitted to the arm.
Figure 12:
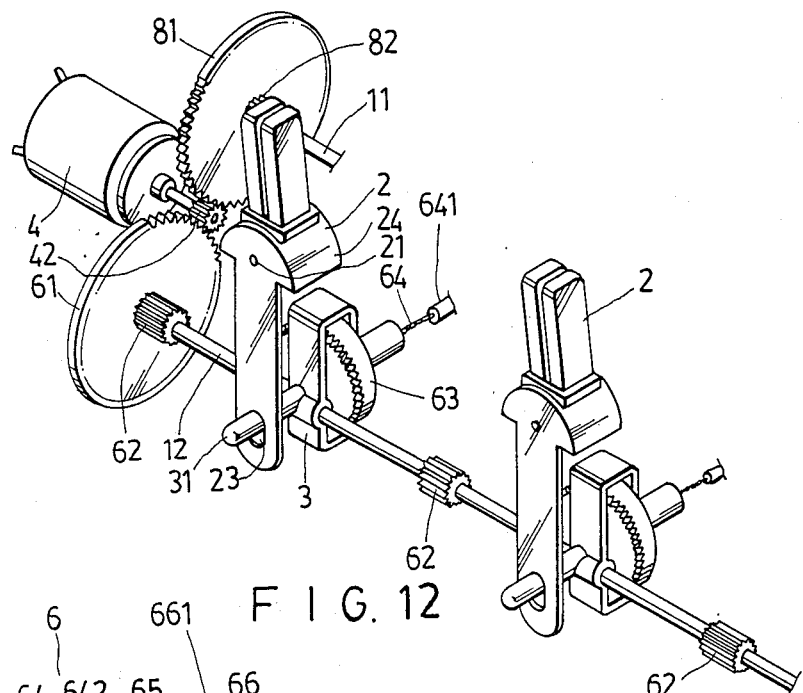
FIG. 12 is a fragmentary view showing the relationship between the clutch members, worms and gears.

As described above, the members 51 and 52 can be moved by the first and second rotating units 6 and 8. These units 6 and 8 are driven by the motor 4 through the transmission system provided in the body 1. As shown in FIGS. 2, 11 and 12, the transmission system includes two parallel shafts 11 and 12 driven simultaneously by the motor 4 through gears 42, 61 and 81. On the shaft 12 are mounted four worms 62 at intervals and three gears 63 for engaging with the worms 62 respectively. Each gear 63 is disposed on the shaft 12 by means of a clutch seat 3 (FIG. 12) which is slidably mounted on the shaft 12. The seats 3 can be displaced along the shaft 12 by operating clutch members 2 so that each gear 63 can be engaged with or disengaged from two worms 62 disposed on its two sides.

Each clutch member 2 has its arm portion 23 provided with an aperture for insertion of a projecting rod 31 of the clutch seat 3, and its head portion 24 extended in part outwardly from the body 1. The head portion 24 is pivoted to the body 1 through a pin 21 (FIG. 12) inserted in the annular boss 15 (FIG. 11) of the front wall of the body 1 and the annular boss 241 of the head portion 24. A spring 22 is also loaded in mounting the clutch member 2 on the body 1. Since such a construction can be appreciated by one who is skilled in the art, the detail thereof is not described herein. When the head portion 24 is turned about the pin 21, the arm portion 23 will move the seat 3 as well as the gear 63.

On the shaft 11 are mounted four worms 82 and three seats 3 supporting three gears 83 respectively. The seats 3 can be moved along the shaft 11 by means of three clutch members 2 which are pivoted to the body 1.

Each gear 63 has one end of its axis 631 connected to a transmitting cord 64 made of a plurality of metal wires twisted together. There are further provided sleeve members 641 (FIG. 11) each of which is provided around the connecting joint of the cord 64 and the axis 631. The other ends of the transmitting cords 64 are connected to the ends of the axes 651 of the worms 652 of the first rotating unit 6, as better shown in FIG. 6. There are sleeve members 642 provided around the connecting joints of the cords 64 and the axes 651. Similarly, each gear 83 has one end of its axis 831 connected to a transmitting cord 64 which is made of a plurality of metal wires twisted together, as shown in FIG. 11. The cord 64 is in turn connected to the axis 651 of the worm 652 of the second rotating unit 8, as shown in FIG. 7. Sleeve members 641 and 642 are provided around the connecting joints of the cords 64 and axes 831 and the joints of the cords 64 and axes 851. There are further provided elongated plastic tubes 645 around the transmitting cords 64.

When the motor 4 is actuated, the shafts 11 and 12 will rotate simultaneously and transmit the motion to the worms 62 and 82 respectively. The motions of the worms 62 and 82 can be transmitted to the corresponding rotation units 6 and 8 when the gears 63 and 83 are meshed with the corresponding worms 62 and 82 by means of clutch members 2 which are operated by hand.

It can be appreciated that the direction of the rotation of the first member relative to the second member or the direction of the rotation of the second member relative to the first member can be reversed by turning the clutch member 2 towards the reversed direction to cause the gear 63 or 83 to disengage from the gear 62 or 82 which is on its one side and then engage with the gear 62 or 82 which is on its other side.

Since the transmission cords are employed in the transmission system, the amount of parts required to be used for transmitting the motion along a long transmission line can be reduced. The invention also has the advantage of simplifying the fabrication of parts since similar parts are repeatedly used in the transmission system.

It can also be appreciated that the gear 87 of the second rotating unit 8 is a spur gear provided with a notch 89 at its lateral portion so that the angle of the rotation of the first member relative to the second member can be limited.

Referring to FIG. 2, the angular movement of the first member 51 is limited so that it does not exceed the angle represented by $\theta$. Also, the angular movement of the second member 52 relative to the first member 51 is limited by providing a protrusion 692 on the end 527 of the second member 52 which is to be engaged with a protrusion 693 provided in the first member 51 (FIG. 4), so that, when the protrusions 692 and 693 are engaged with one another, the movement of the crown gear 69 will be stopped.

Referring again to FIGS. 6 and 7, when the gear 87 is prevented from movement because the first member 51 which is fixedly connected therewith meets a barrier, or when the crown gear 69 is prevented from movement because the second member 52 which is fixedly connected therewith meets a barrier, the gears 682, 681, 672, 671, 66 and 652 will also be prevented from movement. In this situation, the worm gear 65 which is continuously driven by the motor 4 can not be meshed with the worm 652. However, this worm gear 65 will not move apart from the worm 652 because of the retention of the spring 102.

With the invention thus explained, it is apparent that various modifications and variations can be made without departing from the scope of the invention. It is therefore intended that the invention be limited as indicated in the appended claims.

What I claim is:

1. A robot toy including a body incorporating a movable arm operated by a motor through a transmission system, and the improvements wherein the movable arm is constituted of alternatingly interconnected first members and second members, each said first member having a first end, a second end and a first rotating unit, each said second member having a third end for connection with said first end and said first rotating unit which rotates said second member about the longitudinal axis of said first member, a fourth end for connection with said second end of the next first member, and a second rotating unit for rotating said next first member about an axis perpendicular to said longitudinal axis, and said transmission system includes first gear members separately mounted in said robot body and driven by said motor simultaneously, second gear members for meshing with said first gear members respectively, clutch members for engaging and disengaging said first and second gear members, and a plurality of transmitting cords which are made of metal wires twisted together each of said cords is interconnected to a different one of said second gear members and one of said first and second rotating units for transmitting the movements of its respective second gear member to its respective one of said first and second roating units.

2. A robot toy as claimed in claim 1, wherein said first gear members are fixedly mouted on two parallel shafts which are driven by the motor simultaneously.

3. A robot toy as claimed in claim 2, wherein said second gear members are mounted respectively on clutch seats for rotating about axes which are perpendicular to said shaft, said clutch seats being mounted on said said shafts in axially movable positions.

4. A robot toy as claimed in claim 3, wherein each of said clutch members is pivoted to said body and has a lower arm portion connected to each of said clutch seats and has a head portion extended outwardly of said body.

5. A robot toy as claimed in claim 4, wherein said first rotating unit includes a plurality of intermeshed third gears and a crown gear which is meshed with one of said third gears and is secured to said third end of said second member.

6. A robot toy as claimed in claim 5, wherein each of said transmission cords are connected to the axis of said second gear member and the axis of one of said third gears.

7. A robot toy as claimed in claim 4, wherein said second rotating unit includes a plurality of intermeshed third gears and a fourth spur gear which is meshed with one of said third gears and is fixed to said second end of said first member.

8. A robot toy as claimed in claim 1, wherein the movable arm is constituted of three first members and three second members.

9. A robot toy as claimed in claim 8, further comprising a claw means connected to one of said second members, said claw means including an upper claw portion which is movably mounted in said second member and moved by said second rotating unit, and a lower claw portion which is fixedly mounted in said second member.

* * * * *